United States Patent [19]
Funakoshi et al.

[11] Patent Number: 6,103,856
[45] Date of Patent: Aug. 15, 2000

[54] POLYCARBONATE COMPOSITION

[75] Inventors: Wataru Funakoshi; Katsushi Sasaki, both of Iwakuni, Japan

[73] Assignee: Teijin Limited, Osaka, Japan

[21] Appl. No.: 09/299,600

[22] Filed: Apr. 27, 1999

[30] Foreign Application Priority Data

Apr. 28, 1998 [JP] Japan ................... 10-118480

[51] Int. Cl.$^7$ ................................ C08C 64/00
[52] U.S. Cl. .......................... 528/198; 528/196
[58] Field of Search ...................... 528/196, 198

[56] References Cited

U.S. PATENT DOCUMENTS

| | | | |
|---|---|---|---|
| 4,216,305 | 8/1980 | Carnahan | 528/196 |
| 4,999,420 | 3/1991 | Leitz et al. | 528/371 |

FOREIGN PATENT DOCUMENTS

| | | |
|---|---|---|
| 41-3455 | 2/1941 | Japan . |
| 41-15177 | 8/1941 | Japan . |
| 41-15178 | 8/1941 | Japan . |
| 41-19709 | 11/1941 | Japan . |

OTHER PUBLICATIONS

Brunelle et al., "Preparation and Polymerization of Bisphenol a Cyclic Oligomeric Carbonates", *Macromolecules*, vol. 24, pp. 3035–3044, 1991.

*Primary Examiner*—Terressa M. Boykin
*Attorney, Agent, or Firm*—Sughrue, Mion, Zinn, Macpeak & Seas, PLLC

[57] ABSTRACT

A polycarbonate composition contains 100 parts by weight of a linear aromatic polycarbonate and 0.001 to 100 parts by weight of a cyclic aromatic carbonate. The cyclic aromatic carbonate is useful as a flowability-improving agent and a shape-transferability-improving agent for the linear aromatic polycarbonate.

14 Claims, No Drawings

POLYCARBONATE COMPOSITION

DETAILED DESCRIPTION OF THE INVENTION

The present invention relates to a polycarbonate composition, a substrate for optical recording media, made from the composition, and a flowability improving agent for polycarbonates. More specifically, it relates to a polycarbonate composition which has improved flowability without reducing heat resistance, impact resistance and transparency as well as a substrate for optical recording media, made from the composition, and a flowability improving agent for polycarbonates.

Polycarbonate resins have been used in a wide variety of fields in large quantities thanks to their excellent physical properties such as transparency, heat resistance and mechanical strength. Particularly, polycarbonates are used in optical disk substrates in large quantities owing to their excellent transparency, heat resistance in a high-temperature environment at the time of use, and impact resistance for handling it. However, polycarbonate resins have higher melt viscosity and lower flowability than other thermoplastic resins for injection molding and are therefore inferior in moldability. As one of solutions to these problems, there has been proposed a method for improving flowability by using a polycarbonate having a low degree of polymerization or by introducing a flexible chain structure into part of the structure of the polymer chain of a polycarbonate.

For example, U.S. Pat. No. 4,216,305 proposes a copolycarbonate resin comprising 1 wt % or more of structural units represented by the following formula (3):

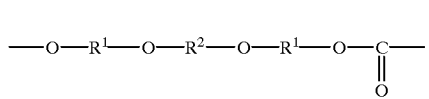

(3)

wherein $R^1$ is a divalent aromatic group having 6 to 30 carbon atoms, and $R^2$ is an alkylene or alkylene arylene group having 1 to 13 carbon atoms.

Although the flowability of this copolycarbonate resin is improved to some extent, there arises another problem that the heat resistance of the copolycarbonate resin greatly lowers.

For instance, in Example of the above USP, a copolycarbonate having a glass transition temperature of 125° C. which is much lower than 150° C. of a base polycarbonate is obtained. A more important point is that the heat decomposition start temperature in the air is greatly lowered by a residual alkylene group introduced into the structure of the copolycarbonate, thereby causing the thermal decomposition of the polymer at the time of molding. Therefore, to eliminate this problem, a polycarbonate resin whose polymerization degree is reduced to improve flowability without introducing an additive component is used in fact.

However, when the polymerization degree of a polycarbonate is reduced, there arises such a problem that impact resistance, one of the characteristic features of a polycarbonate resin, deteriorates. Therefore, the development of a technology for improving the moldability of a polycarbonate resin without reducing the polymerization degree of the polycarbonate while retaining the heat resistance, impact resistance and transparency of the polycarbonate resin has been awaited.

It is an object of the present invention to provide a polycarbonate composition having high flowability and transferability at the time of molding without impairing the heat resistance, transparency and impact resistance of a polycarbonate.

It is another object of the present invention to provide a flowability improving agent for polycarbonates which can provide the above polycarbonate composition of the present invention.

It is still another object of the present invention to provide a substrate for optical recording media, which has the characteristic properties of a polycarbonate, that is, transparency, heat resistance and impact resistance, and is made from the above polycarbonate composition of the present invention.

It is a further object of the present invention to provide an optical recording medium comprising the above substrate of the present invention.

Other objects and advantages of the present invention will become apparent from the following description.

According to the present invention, firstly, the above objects and advantages of the present invention are attained by a polycarbonate composition comprising:

(A) 100 parts by weight of a linear aromatic polycarbonate; and (B) 0.001 to 100 parts by weight of a cyclic aromatic carbonate represented by the following formula (1):

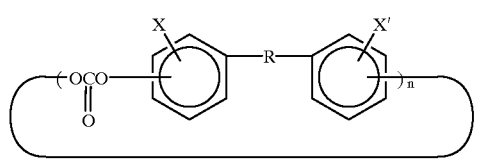

(1)

wherein R is an alkylidene group having 2 to 10 carbon atoms, alkylene group having 1 to 10 carbon atoms, cycloalkylidene group having 6 to 10 carbon atoms, cycloalkylene group having 6 to 10 carbon atoms, phenyl group-substituted alkylene group having 7 to 11 carbon atoms, oxygen atom, sulfur atom, sulfoxide group or sulfone group, X and X' are the same or different and each a hydrogen atom, alkyl group having 1 to 10 carbon atoms, cycloalkyl group having 6 to 10 carbon atoms, halogen atom, alkoxy group having 1 to 10 carbon atoms or aryl group having 6 to 20 carbon atoms, and n is a number of 1 to 6.

The linear aromatic polycarbonate (A) used in the present invention is a linear aromatic polycarbonate obtained by reacting an aromatic dihydroxy compound with a carbonate precursor. The aromatic dihydroxy compound used herein is preferably a compound represented by the following formula (4).

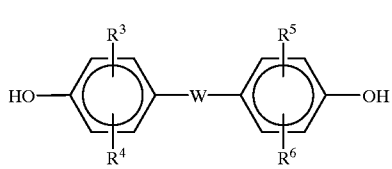

(4)

In the above formula (4), $R^3$, $R^4$, $R^5$ and $R^6$ are independently a hydrogen atom, alkyl group having 1 to 4 carbon atoms, cycloalkyl group or phenyl group, W is an alkylidene group having 2 to 10 carbon atoms, alkylene group having 1 to 10 carbon atoms, cycloalkylidene group having 6 to 10 carbon atoms, cycloalkylene group having 6 to 10 carbon atoms, phenyl group-substituted alkylene group having 7 to 11 carbon atoms, oxygen atom, sulfur atom, sulfoxide group or sulfone group.

Illustrative examples of the aromatic dihydroxy compound include bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)oxide, bis(3,5-dichloro-4-hydroxyphenyl)oxide, p,p'-dihydroxyphenyl, 3,3'-dichloro-4,4'-dihydroxydiphenyl, bis(hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfide, bis(4-hydroxyphenyl)sulfoxide and the like. Out of these, 2,2-bis(4-hydroxyphenyl)propane is particularly preferred.

The aromatic ring of these aromatic dihydroxy compounds may be substituted by alkyl group(s), phenyl group(s) or cycloalkyl group(s). These aromatic dihydroxy compounds may be used alone or in combination of two or more.

The carbonate precursor is a carbonyl halide, carbonic acid diester or haloformate.

Specific examples of the carbonate precursor include phosgene, dihaloformates of divalent phenols and carbonic acid diesters such as diphenyl carbonate, ditolyl carbonate, bis(o-chlorophenyl)carbonate, bis(p-nitrophenyl)carbonate, m-cresyl carbonate, dinaphthyl carbonate, bis(diphenyl) carbonate, dimethyl carbonate and diethyl carbonate.

The linear aromatic polycarbonate of the present invention may contain one or more of aliphatic diols such as ethylene glycol, 1,4-butanediol, 1,4-cyclohexane dimethanol, 2,2-dimethyl-1,3-propanediol, 1,10-decanediol, diethylene glycol, tetraethylene glycol, polyethylene glycol and polytetramethylene glycol, dicarboxylic acids such as succinic acid, isophthalic acid, 2,6-naphthalenedicarboxylic acid, adipic acid, cyclohexanedicarboxylic acid and terephthalic acid, and oxyacids such as p-hydroxybenzoic acid, 6-hydroxy-2-naphthoic acid and lactic acid to reduce glass transition temperature or for other purpose.

Typical polycarbonate production methods include a solution polycondensation method (interfacial polycondensation method) and a melt polycondensation method (ester exchange method).

In the interfacial polycondensation method using phosgene, an aromatic dihydroxy compound is generally dissolved in an aqueous solution of an acid binder and reacted in the presence of a solvent.

The acid binder is an alkali metal hydroxide such as sodium hydroxide or potassium hydroxide and the solvent is preferably a hydrocarbon halide such as methylene chloride or chlorobenzene.

A terminal capping agent is generally used for a polymerization reaction. The terminal capping agent is preferably an aromatic monohydroxy compound such as p-tert-butylphenol or cumylphenol and used in an amount of 0.01 to 10 mol %, preferably 0.03 to 8 mol % based on the aromatic dihydroxy compound.

The reaction temperature is 0 to 40° C., preferably 20 to 30° C., and the reaction time is 10 minutes to 10 hours. It is preferred to maintain the pH of the reaction system at 9 or more as the reaction proceeds. A catalyst may be used to promote the reaction. Specific examples of the catalyst include tertiary amines such as triethylamine, tetra-n-butyl ammonium bromide and tetra-n-butyl phosphonium bromide, quaternary ammonium compounds, quaternary phosphonium compounds and the like.

The ester exchange reaction which uses a carbonic acid diester and an aromatic dihydroxy compound is carried out in an inert gas atmosphere, preferably in the presence of a catalyst, by heating, stirring and distilling out an aromatic monohydroxy compound.

The reaction temperature is generally 120 to 300° C. To promote the removal of the produced aromatic monohydroxy compound by distillation, the reaction is carried out at a temperature of 120 to 250° C. and a pressure of 200 to 100 mmHg in an initial stage and at a temperature of 200 to 300° C. and a pressure of 10 mmHg or less in a latter stage.

The reaction time is generally 1 to 10 hours until a desired polymerization degree is obtained.

Illustrative examples of the polymerization catalyst include ordinary ester exchange catalysts and esterifying catalysts such as alkali metal compounds such as sodium hydroxide and potassium hydroxide, hydroxides of alkali earth metals, hydrides of boron and aluminum and alkoxides of boron and aluminum, phenolates of monovalent and polyvalent organic acids, organic acid salts, carbonates, hydrocarbon compounds, nitrates, nitrites, sulfites, cyanates, thiocyanates, borates, organic tin compounds, zinc compounds, silicon compounds, germanium compounds, lead compounds, antimony compounds, manganese compounds, titanium compounds, zirconium compounds and other nitrogen-containing basic compounds. These catalysts maybe used alone or in combination of two or more. The amount of the catalyst used is generally $1 \times 10^{-8}$ to $1 \times 10^{-5}$ equivalent based on 1 equivalent of the aromatic dihydroxy compound as a raw material when the catalyst is an alkali metal compound. The amount is preferably $1 \times 10^{-7}$ to $5 \times 10^{-6}$ equivalent, more preferably $1 \times 10^{-7}$ to $2 \times 10^{-6}$ equivalent from the viewpoint of the physical properties of the polymer.

The linear aromatic polycarbonate is preferably stabilized by the addition of a stabilizer represented by the following formula (2):

$$A^1\text{—}(Y^1\text{—}SO_3X^1)_m \qquad (2)$$

wherein $A^1$ is a hydrocarbon group having a valence of m, which may have a substituent, $Y^1$ is a single bond or an oxygen atom, $X^1$ is a secondary or tertiary monovalent hydrocarbon group, an ammonium cation or a phosphonium cation, and m is an integer of 1 to 4.

Specific examples of the compounds of the formula (2) are as follows.

Compounds of the formula (2) in which $Y^1$ is a single bond, $X^1$ is a secondary or tertiary monovalent hydrocarbon and m is 1:

Benzyl benzenesulfonate, 2-phenyl-2-propyl benzenesulfonate, 2-phenyl-2-butyl benzenesulfonate, benzyl toluenesulfonate, 2-phenyl-2-propyl toluenesulfonate, 2-propyl-2-butyl toluenesulfonate, benzyl octylbenzenesulfonate, 2-phenyl-2-propyl octylbenzenesulfonate, 2-phenyl-2-butyl octylbenzenesulfonate, benzyl dodecylbenzenesulfonate, 2-phenyl-2-propyl dodecylbenzenesulfonate, and 2-phenyl-2-butyl dodecylbenzenesulfonate.

Compounds of the formula (2) in which $Y^1$ is a single bond, $X^1$ is a phosphonium cation and m is 1:

Tetramethylphosphonium hexylsulfonate,
tetraethylphosphonium hexylsulfonate,
tetrabutylphosphonium hexylsulfonate,
tetrahexylphosphonium hexylsulfonate,
tetraoctylphosphonium hexylsulfonate,
tetramethylphosphonium octylsulfonate, tetraethylphosphonium octylsulfonate,
tetrabutylphosphonium octylsulfonate,
tetrahexylphosphonium octylsulfonate,
tetraoctylphosphonium octylsulfonate,
tetramethylphosphonium decylsulfonate,
tetraethylphosphonium decylsulfonate,
tetrabutylphosphonium decylsulfonate,
tetrahexylphosphonium decylsulfonate,
tetraoctylphosphonium decylsulfonate,
tetramethylphosphonium dodecylsulfonate,
tetraethylphosphonium dodecylsulfonate,
tetrabutylphosphonium dodecylsulfonate,
tetrahexylphosphonium dodecylsulfonate,
tetraoctylphosphonium dodecylsulfonate,
tetramethylphosphonium hexadecylsulfonate,
tetraethylphosphonium hexadecylsulfonate,
tetrabutylphosphonium hexadecylsulfonate,
tetrahexylphosphonium hexadecylsulfonate,
tetraoctylphosphonium hexadecylsulfonate,
tetramethylphosphonium benzenesulfonate,
tetraethylphosphonium benzenesulfonate,
tetrabutylphosphonium benzenesulfonate,
tetrahexylphosphonium benzenesulfonate,
tetraoctylphosphonium benzenesulfonate,
tetramethylphosphonium toluenesulfonate,
tetraethylphosphonium toluenesulfonate,
tetrabutylphosphonium toluenesulfonate,
tetrahexylphosphonium toluenesulfonate,
tetraoctylphosphonium toluenesulfonate,
tetramethylphosphonium dodecylbenzenesulfonate,
tetraethylphosphonium dodecylbenzenesulfonate,
tetrabutylphosphonium dodecylbenzenesulfonate,
tetrahexylphosphonium dodecylbenzenesulfonate, and
tetraoctylphosphonium dodecylbenzenesulfonate.

Compounds of the formula (2) in which $Y^1$ is an oxygen atom, $X^1$ is a secondary or tertiary monovalent hydrocarbon group and m is 1: (it is preferable that the total carbon number of $A^1$ and $X^1$ be 8 to 40.)

Dibutyl sulfate, dipentyl sulfate, dihexyl sulfate, dioctyl sulfate, dinonyl sulfate, didecyl sulfate, ditridecyl sulfate, ditetradecyl sulfate, dihexadecyl sulfate, dicyclohexyl sulfate, and dibenzyl sulfate.

The alkyl group in these specific examples shall be understood to be a secondary or tertiary alkyl.

Compounds of the formula (2) in which $Y^1$ is an oxygen atom and $X^1$ is an ammonium cation:

Ammonium salts such as ammonium octylsulfate, ammonium decylsulfate, ammonium dodecylsulfate and ammonium hexadecylsulfate; primary ammonium salts such as methylammonium hexylsulfate, methylammonium octylsulfate, methylammonium hexadecylsulfate, ethylammonium hexylsulfate, butylammonium nonadecylsulfate, hexylammonium octadecylsulfate, decylammonium ethylsulfate, decylammonium butylsulfate, decylammonium decylsulfate, dodecylammonium methylsulfate, dodecylammonium ethylsulfate, dodecylammonium octylsulfate, tetradecylammonium butylsulfate, pentadecylammonium methylsulfate, hexadecylammonium butylsulfate, hexadecylammonium octylsulfate, hexadecylammonium decylsulfate and hexadecylammonium dodecylsulfate; secondary ammonium salts such as dimethylammonium hexylsulfate, dimethylammonium octylsulfate, dimethylammonium tetradecylsulfate, diethylammonium octadecylsulfate, butylmethylammonium tetradecylsulfate, hexylmethylammonium tetradecylsulfate, decylmethylammonium methylsulfate, decylethylammonium ethylsulfate, decylmethylammonium octylsulfate, dodecylmethylammonium methylsulfate, tetradecylmethylammonium methylsulfate, tetradecylethylammonium ethylsulfate, pentadecylmethylammonium methylsulfate, pentadecylethylammonium ethylsulfate, hexadecylmethylammonium methylsulfate and hexadecylethylammonium ethylsulfate; tertiary ammonium salts such as trimethylammonium octylsulfate, trimethylammonium decylsulfate, butyldimethylammonium decylsulfate, hexyldimethylammonium dodecylsulfate, decyldimethylammonium methylsulfate, decyldimethylammonium tridecylsulfate, dodecyldiethylammonium ethylsulfate, dodecyldibutylammonium butylsulfate, dodecyldimethylammonium tetradecylsulfate, tetradecyldimethylammonium methylsulfate, tetradecylmethylethylammonium methylsulfate, pentadecyldimethylammonium ethylsulfate, hexadecyldimethylammonium methylsulfate and hexadecylmethylethylammonium ethylsulfate; and quaternary ammonium salts such as tetramethylammonium hexylsulfate, tetraethylammonium tridecylsulfate, butyltrimethylammonium octylsulfate, decyltrimethylammonium methylsulfate, decyltriethylammonium ethylsulfate, decyltrimethylammonium hexadecylsulfate, pentadecyltrimethylammonium methylsulfate and pentadecyldimethylethylammonium ethylsulfate.

The polymerization degree of the linear aromatic polycarbonate is not particularly limited. However, the linear aromatic polycarbonate preferably has a viscosity average molecular weight of 13,000 to 200,000, more preferably 13,000 to 50,000. A polycarbonate resin having a viscosity average molecular weight of 13,000 to 20,000 is advantageously used for disk substrates.

The linear aromatic polycarbonate may contain a conventionally known heat stabilizer, ultraviolet absorber, release agent, colorant, antioxidant, antistatic agent, slipping agent, antiblocking agent, lubricant, anti-fogging agent, natural oil, synthetic oil, wax and organic or inorganic filler in limits not prejudicial to the object of the present invention. These additives may be added simultaneous with, before or after the addition of the cyclic aromatic carbonate.

The cyclic aromatic carbonate used in the present invention is represented by the following formula (1) as described above.

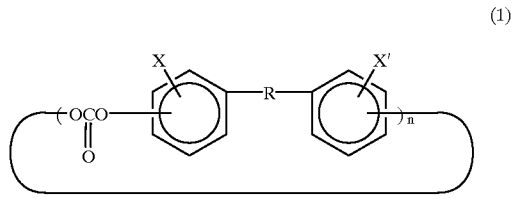

(1)

In the above formula (1), R is an alkylidene group having 2 to 10 carbon atoms, alkylene group having 1 to 10 carbon atoms, cycloalkylidene group having 6 to 10 carbon atoms, cycloalkylene group having 6 to 10 carbon atoms, phenyl group-substituted alkylene group having 7 to 11 carbon atoms, oxygen atom, sulfur atom, sulfoxide group or sulfone group, X and X' are the same or different and each a hydrogen atom, alkyl group having 1 to 10 carbon atoms, cycloalkyl group having 6 to 10 carbon atoms, halogen atom, alkoxy group having 1 to 10 carbon atoms or aryl group having 6 to 20 carbon atoms, and n is a number of 1 to 6.

Out of compounds represented by the above formula (1), compounds represented by the following formulas (1)-1, (1)-2 and (1)-3 are preferred, and compounds represented by the following formula (1)-1 are particularly preferred:

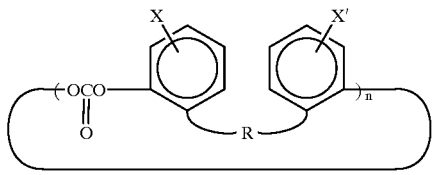
(1)-1 wherein R, X, X' and n are the same as defined above,

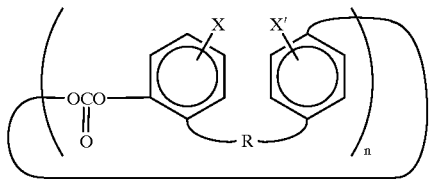
(1)-2 wherein R, X, X' and n are the same as defined above,

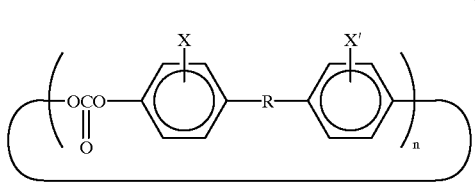
(1)-3 wherein R, X, X' and n are the same as defined above.

In the above formula (1) (including the formulas (1)-1, (1)-2 and (1)-3), R is an alkylidene group having 2 to 10 carbon atoms, alkylene group having 1 to 10 carbon atoms, cycloalkylidene group having 6 to 10 carbon atoms, cycloalkylene group having 6 to 10 carbon atoms, phenyl group-substituted alkylene group having 7 to 11 carbon atoms, oxygen atom, sulfur atom, sulfoxide group or sulfone group.

Specific examples of the alkylene group having 1 to 10 carbon atoms include methylene, 1,2-ethylene, 1,2-propylene, 2,2-propylene, 1,3-trimethylene, 1,4-tetramethylene, 1,6-hexamethylene, 1,10-decamethylene and the like. Specific examples of the cycloalkylene group having 6 to 10 carbon atoms include cyclohexylene, cyclohexylidene, cycloheptylene and the like.

X and X' are each a hydrogen atom, alkyl group having 1 to 10 carbon atoms, cycloalkyl group having 6 to 10 carbon atoms, halogen atom, alkoxy group having 1 to 10 carbon atoms or aryl group having 6 to 20 carbon atoms.

Specific examples of the alkyl group having 1 to 10 carbon atoms include methyl, ethyl, n-propyl, iso-propyl, n-butyl, sec-butyl, tert-butyl, pentyl, hexyl, octyl, nonyl and decyl.

Specific examples of the cycloalkyl group having 6 to 10 carbon atoms include cyclohexyl, cycloheptyl, decalyl and the like.

Specific examples of the halogen atom include fluorine, chlorine and bromine.

Specific examples of the alkoxy group having 1 to 10 carbon atoms include methoxy, ethoxy, n-propoxy, iso-propoxy, n-butoxy, sec-butoxy, tert-butoxy, pentoxy, hexoxy, octoxy, nonyloxy and decyloxy.

Specific examples of the aryl group having 6 to 20 carbon atoms include phenyl, tolyl, naphthyl, biphenyl and the like.

n is an integer of 1 to 6, preferably 1 to 5, more preferably 1 to 3.

Illustrative examples of the aromatic dihydroxy compound constituting the cyclic aromatic carbonate represented by the above formula (1) include bis(2-hydroxyphenyl)methane, 2,2-dihydroxydiphenyl, 2,2'-dihydroxydiphenyl sulfone, 2,2-bis(2'-hydroxyphenyl)propane, 2,2'-dihydroxydiphenyl ketone, 2,2'-dihydroxydiphenyl ether, 2,2'-dihydroxydiphenyl sulfide, 2,2'-dihydroxy-5,5'-dimethoxydiphenyl sulfide, 2,2'-dihydroxy-5,5'-dimethyldiphenyl ether, 2,2'-dihydroxy-5,5'-diethyldiphenyl ether and the like.

Illustrative examples of the cyclic aromatic carbonate represented by the above formula (1) are compounds represented by the following formulas.

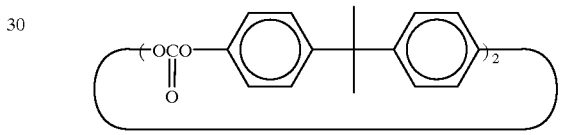

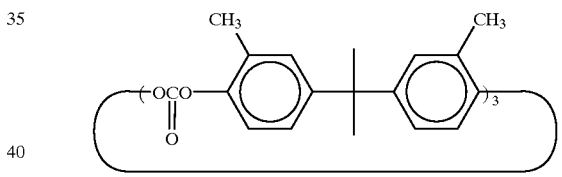

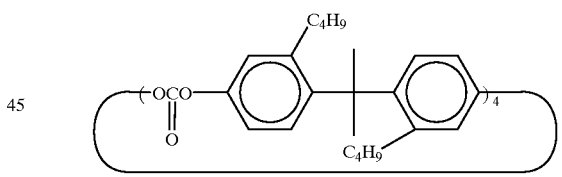

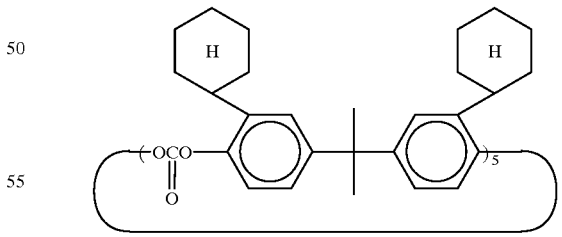

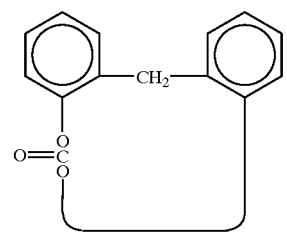

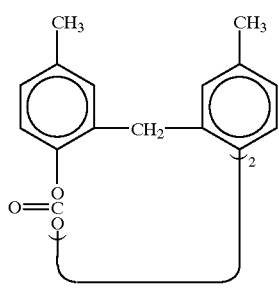
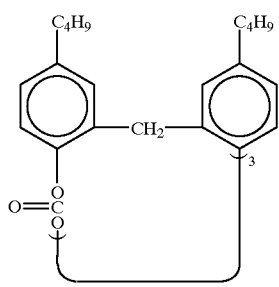
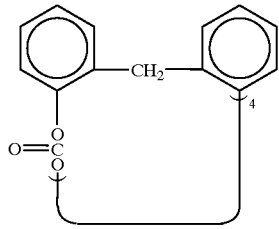
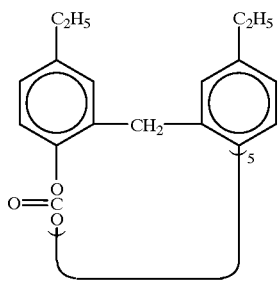
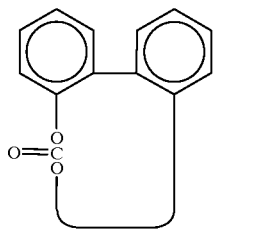
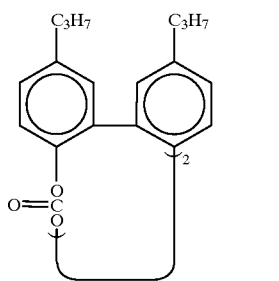
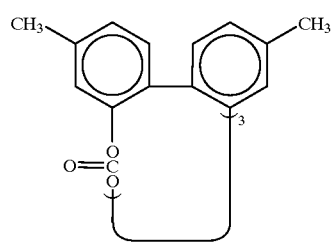
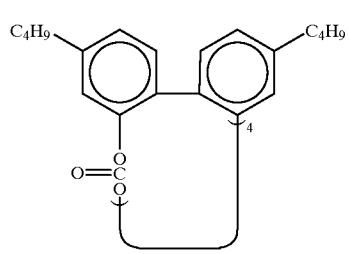
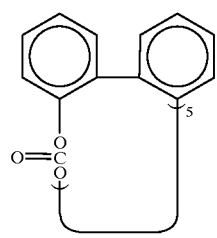
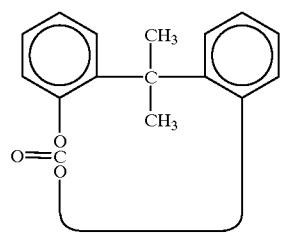
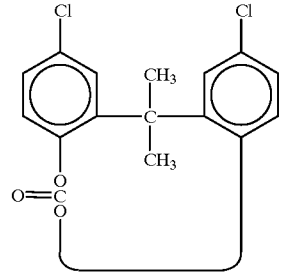
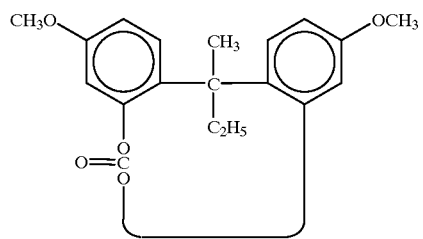

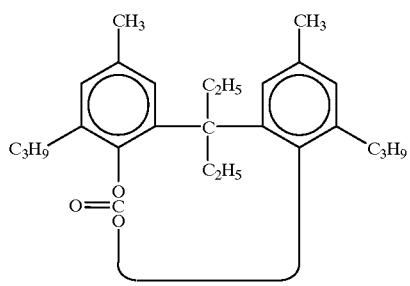
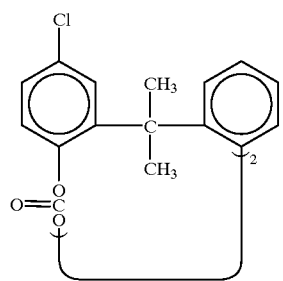
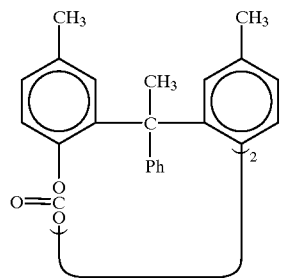
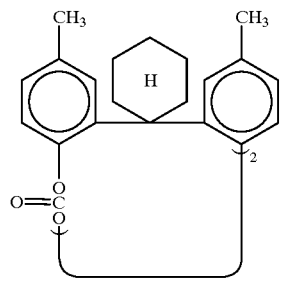
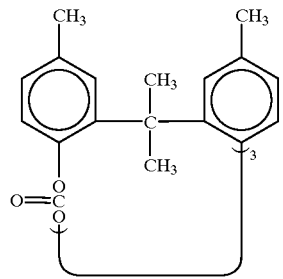
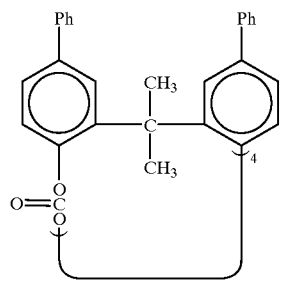
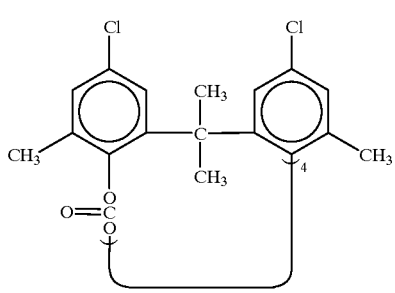
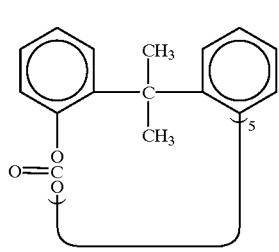
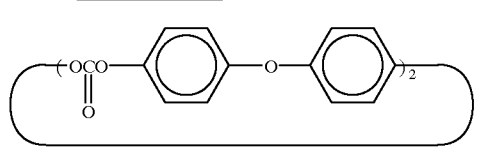
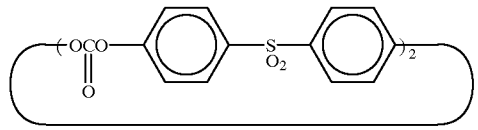
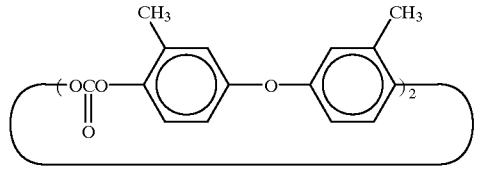
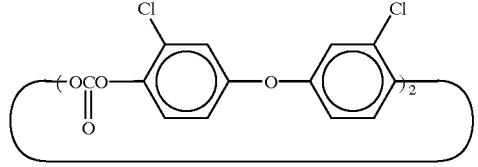
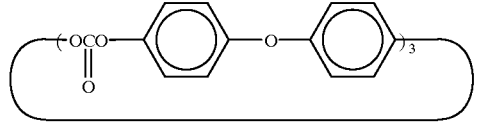
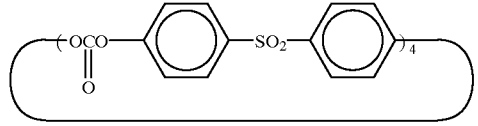
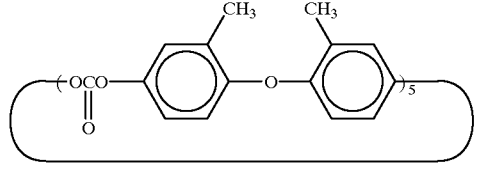

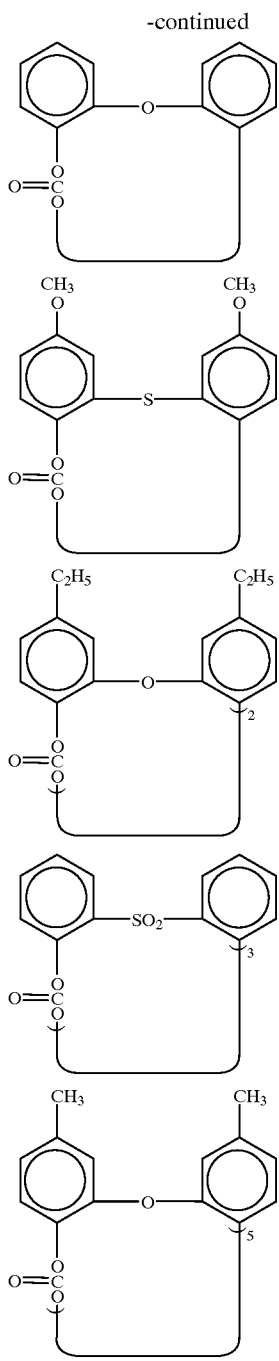

These cyclic aromatic carbonates may be used alone or in combination of two or more. When two or more of the cyclic aromatic carbonates are used in combination, the melting point of the mixed cyclic aromatic carbonate lowers, which is preferred from the view point of handling.

The cyclic aromatic carbonate can be produced by conventionally known methods, for example, methods disclosed by D. J. Brunnelle et al, Macromolecules, vol. 24, pp. 3035, 1991, JP-B 41-3455, JP-B 41-15177, JP-B 41-15178 and JP-B 41-19709 (the term "JP-B" used herein means "Examined Japanese Patent Publication").

For instance, the cyclic aromatic carbonate can be synthesized from a combination of the above aromatic dihydroxy compound and an aromatic carbonic acid diester such as diphenyl carbonate, an aliphatic carbonic acid diester such as dimethyl carbonate or a carbonyl halide such as phosgene in accordance with methods disclosed by the above patents.

The cyclic aromatic carbonate may contain a slight amount of a linear polycarbonate or a linear oligocarbonate as an impurity.

The molecular weight of the cyclic aromatic carbonate is preferably not so large, that is, 212 to 1,500, from the viewpoints of improving moldability and transferability and further handling properties.

The inventors of the present invention have found that the melt flowability of a linear aromatic polycarbonate is improved when the above cyclic aromatic carbonate used in the present invention is mixed with the linear aromatic polycarbonate.

Therefore, according to the present invention, there are also provided use of a cyclic aromatic carbonate represented by the above formula (1) to improve the melt flowability of a linear aromatic polycarbonate by mixing it with the linear aromatic polycarbonate, and a flowability improving agent for a linear aromatic polycarbonate, for example, a linear aromatic polycarbonate for use as a raw material for the production of a substrate for optical recording media, which comprises a cyclic aromatic carbonate represented by the above formula (1).

The present inventor has also found that the shape transferability at the time of molding of a linear aromatic polycarbonate is improved when the cyclic aromatic carbonate represented by the above formula (1) used in the present invention is mixed with the linear aromatic polycarbonate.

Therefore, according to the present invention, there are also provided use of a cyclic aromatic carbonate represented by the above formula (1) to improve the shape transferability at the time of molding of a linear aromatic polycarbonate by mixing it with the linear aromatic polycarbonate, and a shape transferability improving agent for a linear aromatic polycarbonate, for example, a linear aromatic polycarbonate for use as a raw material for the production of a substrate for optical recording media, which comprises a cyclic aromatic carbonate represented by the above formula (1).

The cyclic aromatic carbonate represented by the above formula (1) used in the present invention is mixed in an amount of 0.001 to 100 parts by weight based on 100 parts by weight of the linear aromatic polycarbonate. The amount is preferably 0.003 to 100 parts by weight, more preferably 0.005 to 100 parts by weight, much more preferably 0.005 to 50 parts by weight based on the same standard. The amount is particularly preferably 0.001 to 50 parts by weight, more particularly preferably 0.001 to 20 parts by weight, the most particularly preferably 0.05 to 20 parts by weight.

When the amount of the cyclic aromatic carbonate is too small, the addition effect is hardly obtained and when the amount is too large, it is not desirable from an economical point of view.

A feeder and a method for adding the cyclic aromatic carbonate to the linear aromatic polycarbonate as used in the present invention are not particularly limited. The cyclic aromatic carbonate may be added directly while it is solid or after it is molten by heating or dissolved in a solvent. It may be added while the linear aromatic polycarbonate is molten before it is cooled from a polymerizer and pelletized or at the time of extrusion molding.

Since the thus obtained polycarbonate composition has improved flowability without reductions in heat resistance, impact resistance and transparency, it can be preferably used as an optical material, particularly preferably for optical recording disk substrates. That is, as the polycarbonate composition obtained by the present invention has excellent flowability and transferability when it is molded into a disk, it can be particularly preferably used for optical recording disk substrates.

The polycarbonate composition of the present invention preferably has a melt viscosity change rate of 0.5% or less. The composition showing this melt viscosity change rate is excellent in melt viscosity stability and advantageously used for the production of substrates for optical recording media.

Therefore, according to the present invention, there are also provided a substrate for optical recording media which is made from the polycarbonate composition of the present invention and an optical recording medium comprising the above substrate for optical recording media and an optical recording layer formed on one side of the substrate directly or through an intermediate layer.

This optical recording medium may comprise an dielectric layer or a reflective layer if necessary like known optical recording media.

The following examples are given to further illustrate the present invention. In the following examples, "%" means "% by weight" and measurements were carried out in accordance with the following methods.

1) glass transition temperature: measured in a stream of nitrogen at a temperature elevation rate of 20° C./min by the 910 DSC of Dupont Instrument Co., Ltd.
2) 5% weight reduction temperature: measured in the air or gas stream at a temperature elevation rate of 20° C./min by the 951TGA of Dupont Instrument Co., Ltd.
3) melt viscosity stability: Changes in melt viscosity are measured at a shearing speed of 1 rad/sec. and a temperature of 270° C. in a stream of nitrogen by the RAA type flow analyzer of Rheometrics Co., Ltd. for 30 minutes and the change rate per 1 minute is obtained. Since melt viscosity changes linearly 5 minutes after melting at 270° C., time changes in melt viscosity (unit: poise) are recorded and the melt viscosity change rate is obtained from the following when melt viscosity at the start of the linear change is V1 and melt viscosity 30 minutes after that is V2.

$$(V1-V2) \times 100/(V1 \times 30) \ (\%)$$

4) flowability: MFR (the amount of a polymer passing through a dice having a diameter of 2.095 mm and a length of 8.000 mm at a temperature of 280° C. under a load of 2,160 g) per 10 minutes is measured in accordance with the JIS K7210 flow test for thermoplastics after pellets are dried at 120° C. for 6 hours.
5) color: A plate measuring 50 mm×50 mm×5 mm is molded by the Neomat N150/75 injection molding machine of Sumitomo Heavy Industries, Ltd. at a cylinder temperature of 280° C. and a molding cycle of 3.5 sec, and the b value of the plate is measured by the Z-1001 DP color difference meter of Nippon Denshoku Co., Ltd. The larger the b value the worse the color becomes.
6) transparency: The total light transmittance of the plate is measured by the NDH-Σ80 of Nippon Denshoku Co., Ltd. The higher the total light transmittance the higher the transparency becomes.
7) impact resistance: measured by the ASTMD-790 (notched) Izod impact strength tester using a ⅛-inch sample piece.
8) transferability: The pit depth (unit: nm) of a CD disk which is molded by the Disk5 MIII disk molding machine of Sumitomo Heavy Industries, Ltd. at a cylinder temperature of 345° C., a mold temperature of 75° C., an injection speed of 100 mm/sec and an injection pressure of 80 kg is measured.

[production of polymer A]

5,028 g (22.1 mols) of bisphenol A, 22.1 l (41.9 mols of sodium hydroxide) of a 7.2% aqueous solution of sodium hydroxide and 9.8 g (0.056 mol) of sodium hydrosulfite were charged into a 50 l reactor equipped with a phosgene blowing tube, thermometer and stirrer, and dissolved. 12.7 l of methylene chloride and 807 g (9.8 mols of sodium hydroxide) of a 48.5% aqueous solution of sodium hydroxide were added to the resulting solution under agitation and 2.508 g (25.3 mols) of phosgene was also added at 25° C. over 90 minutes to carry out the reaction of phosgene.

After the end of the reaction of phosgene, 175.1 g (1.17 mols) of p-tert-butylphenol, 804 g (9.7 mols) of a 48.5% aqueous solution of sodium hydroxide and 18.1 ml (0.13 mol) of triethylamine as a catalyst were added and stirred for 2 hours while the temperature was maintained at 33° C. to complete a reaction. A methylene chloride layer was separated from the reaction mixture solution and purified by washing with water to give a polycarbonate resin having a viscosity average molecular weight of 15,300. The physical properties of this polymer are shown in Table 1.

[production of polymer B]

5,028 g (22.1 mols) of bisphenol A, 22.1 l (41.9 mols of sodium hydroxide) of a 7.2% aqueous solution of sodium hydroxide and 9.8 g (0.056 mol) of sodium hydrosulfite were charged into a 50 l reactor equipped with a phosgene blowing tube, thermometer and stirrer, and dissolved. 12.7 l of methylene chloride and 807 g (9.8 mols of sodium hydroxide) of a 48.5% aqueous solution of sodium hydroxide were added to the resulting solution under agitation and 2,508 g (25.3 mols) of phosgene was also added at 25° C. over 90 minutes to carry out a phosgene reaction.

After the end of the phosgene reaction, 93.0 g (0.62 mol) of p-tert-butylphenol, 804 g (9.7 mols) of a 48.5% aqueous solution of sodium hydroxide and 18.1 ml (0. 13 mol) of triethylamine as a catalyst were added and stirred for 2 hours while the temperature was maintained at 33° C. to complete a reaction. A methylene chloride layer was separated from the reaction mixture solution and purified by washing with water to give a polycarbonate resin having a viscosity average molecular weight of 25,100. The physical properties of this polymer are shown in Table 2.

[production of polymers C, D, C' and D']

228 parts by weight of bisphenol A, 220 parts by weight of diphenyl carbonate, and a bisphenol A—$Na_2$ salt (1.6× $10^{-5}$ part by weight; 0.1 μmol/1 mol of bisphenol A) and tetramethyl ammonium hydroxide (9.1×$10^{-3}$ part by weight; 100 μmol/1 mol of bisphenol A) as ester exchange catalysts were charged into a reactor equipped with a stirrer, distillation column and decompression device, the inside of the reactor was substituted with nitrogen, and then the above materials were dissolved at 140° C. After 30 minutes of agitation, a reaction was carried out for 30 minutes by elevating the inside temperature of the reactor to 180° C. and controlling the inside pressure to 100 mmHg to distill out the produced phenol. The reaction was further carried out for 30 minutes while the phenol was distilled out by elevating the inside temperature to 200° C. and gradually reducing the inside pressure to 50 mmHg.

The reaction was further continued by gradually elevating the temperature to 220° C. and reducing the pressure to 30 mmHg and maintaining that temperature and that pressure for 30 minutes, and further by elevating the temperature to 240° C. and reducing the pressure to 10 mmHg and then to 260° C. and to 1 mmHg in the same manner as described above.

Finally, part of the polymer was extracted to measure its molecular weight while the polycondensation of the carbonate was continued at a temperature of 260° C. and not higher than 270° C. The polycondensation was continued until the molecular weight became 15,300 (polymer C) or 25,100 (polymer D).

After the end of polymerization, tetrabutyl phosphonium dodecylbenzene sulfonate ($1.75 \times 10^{-4}$ part by weight; 0.3 μmol/1 mol of bisphenol A) was added to deactivate the catalysts. A polymer obtained without adding tetrabutyl phosphonium dodecylbenzene sulfonate after the end of polymerization and having a molecular weight of 15,300 was named polymer C' and a polymer obtained without adding tetrabutyl phosphonium dodecylbenzene sulfonate and having a molecular weight of 25,100 was named polymer D'. The viscosity average molecular weight after the end of polycondensation and other physical properties of the polymers are shown in Tables 1 and 2 below.

EXAMPLES 1 to 10 AND COMPARATIVE EXAMPLES 1 to 4

(1) The polycarbonates A to D, C' and D' produced as described above were kneaded with predetermined amounts (based on 100 parts by weight of a linear aromatic polycarbonate shown in the tables: parts by weight) of cyclic aromatic carbonates represented by the following formulas (a), (b) and (c) by a double-screw extruder (L/D=20, barrel temperature of 285° C.), respectively.

(a)
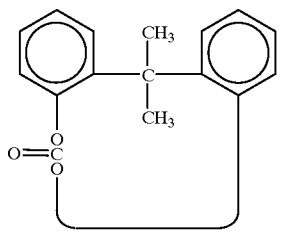

(b)
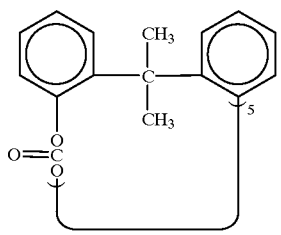

(c)
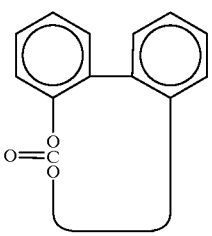

The physical properties of the obtained compositions and the molded products of the compositions were measured. The results of the polymer A, C and C' are shown in Table 1 and the results of the polymers B, D and D' are shown in Table 2.

As shown in the tables, the polymer of the present invention has high flowability as well as heat resistance, impact resistance and transparency of the same level as those of a base polycarbonate.

As Comparative Examples, the physical properties of polycarbonates A to D which did not contain a cyclic aromatic carbonate were measured.

The results of the polymers A, C and C' are shown in Table 1 and the results of the polymers B and D are shown in Table 2.

(2) The polycarbonate compositions of Examples 1 to 5 and Comparative Examples 1 and 2 obtained from the polymers A, C and C' produced as described above were used to mold a CD Disk by the Disk5 MIII disk molding machine of Sumitomo Heavy Industries, Ltd. at a cylinder temperature of 345° C., a mold temperature of 75° C., an injection speed of 100 mm/sec and an injection pressure of 80 kg and the pit depth (unit: nm) of the disk was measured. The results are shown in Table 1. The larger the depth the higher the transferability becomes.

As shown in table 1, the polymers of the present invention have high flowability as well as heat resistance, impact resistance and transparency of the same level as those of a base polycarbonate and high transferability at the time of molding a disk.

TABLE 1

| test No. | type of polymer *1 | molecular weight of polymer | type of cyclic aromatic carbonate *2 | Tg (° C.) | 5 % weight reduction temperature (° C.) | melt viscosity stability (%) |
|---|---|---|---|---|---|---|
| Ex. 1 | A | 15300 | a, (0.5) | 142 | 485 | 0 |
| Ex. 2 | A | 15300 | a, (1.0) | 140 | 485 | 0 |
| Ex. 3 | C | 15300 | b, (0.5) | 143 | 485 | 0 |
| Ex. 4 | C | 15300 | b, (1.0) | 141 | 485 | 0 |
| C.Ex. 1 | A | 15300 | none | 144 | 485 | 0 |
| C.Ex. 2 | C | 15300 | none | 144 | 485 | 0 |
| Ex. 5 | C' | 15300 | a, (0.5) | 141 | 480 | 0.7 |

TABLE 1-continued

| test No. | flowability (g/10 min) | color (b value) | total light transmittance (%) | impact resistance kg · cm/cm | pit depth of molded disk (nm) |
|---|---|---|---|---|---|
| Ex. 1 | 67 | 3.5 | 90.1 | 10 | 105 |
| Ex. 2 | 70 | 3.5 | 90.1 | 12 | 107 |
| Ex. 3 | 67 | 3.5 | 90.1 | 10 | 105 |
| Ex. 4 | 71 | 3.5 | 90.1 | 12 | 107 |
| C.Ex. 1 | 61 | 3.5 | 90.1 | 10 | 97 |
| C.Ex. 2 | 60 | 3.5 | 90.1 | 9 | 97 |
| Ex. 5 | 67 | 3.7 | 90 | 7 | 101 |

Notes)
*1: Polymers C' was produced without using tetrabutyl phosphonium dodecylbenzene sulfonate in producing polymer C.
*2: based on 100 parts by weight of linear aromatic polycarbonate (parts by weight)

TABLE 2

| test No. | type of polymer *1 | molecular weight of polymer | type of cyclic aromatic carbonate | Tg (° C.) | 5 % weight reduction temperature (° C.) | melt viscosity stability (%) |
|---|---|---|---|---|---|---|
| Ex. 6 | B | 25100 | a, (1.0) | 151 | 486 | 0 |
| Ex. 7 | B | 25100 | a, (3.0) | 150 | 486 | 0 |
| Ex. 8 | D | 25100 | c, (1.0) | 151 | 486 | 0 |
| Ex. 9 | D | 25100 | c, (4.0) | 150 | 486 | 0 |
| C.Ex. 3 | B | 25100 | none | 153 | 486 | 0 |
| C.Ex. 4 | D | 25100 | none | 154 | 486 | 0 |
| Ex. 10 | D' | 25100 | c, (1.0) | 151 | 481 | 0.9 |

| test No. | flowability (g/10 min) | color (b value) | total light transmittance (%) | impact resistance kg · cm/cm |
|---|---|---|---|---|
| Ex. 6 | 12 | 3.9 | 90.1 | 100 |
| Ex. 7 | 15 | 3.9 | 90.1 | 108 |
| Ex. 8 | 11 | 3.9 | 90.1 | 99 |
| Ex. 9 | 14 | 3.9 | 90.1 | 108 |
| C.Ex. 3 | 8 | 3.9 | 90.1 | 92 |
| C.Ex. 4 | 7 | 3.9 | 90.1 | 90 |
| Ex. 10 | 10 | 4.1 | 90 | 100 |

Note)
*1: Polymer D' was produced without using tetrabutyl phosphonium dodecylbenzene sulfonate in producing polymer D.

What is claimed is:

1. A polycarbonate composition comprising:
(A) 100 parts by weight of a linear aromatic polycarbonate which has been prepared by reacting an aromatic dihydroxy compound with a carbonate precursor through solution or melt polycondensation; and
(B) 0.001 to 100 parts by weight of a cyclic aromatic carbonate represented by the following formula (1):

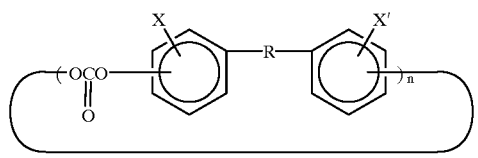

(1)

wherein R is an alkylidene group having 2 to 10 carbon atoms, an alkylene group having 1 to 10 carbon atoms, a cycloalkylidene group having 6 to 10 carbon atoms, a cycloalkylene group having 6 to 10 carbon atoms, a phenyl group-substituted alkylene group having 7 to 11 carbon atoms, an oxygen atom, a sulfur atom, a sulfoxide group or a sulfone group, X and X' are the same or different and each a hydrogen atom, an alkyl group having 1 to 10 carbon atoms, a cycloalkyl group having 6 to 10 carbon atoms, a halogen atom, an alkoxy group having 1 to 10 carbon atoms or an aryl group having 6 to 20 carbon atoms, and n is a number of 1 to 6.

2. The polycarbonate composition of claim 1, wherein the amount of the cyclic aromatic carbonate is 0.003 to 100 parts by weight.

3. The polycarbonate composition of claim 1, wherein the cyclic aromatic carbonate has a molecular weight of 212 to 1,500.

4. The polycarbonate composition of claim 1, wherein the cyclic aromatic carbonate is represented by the following formula (1)-1:

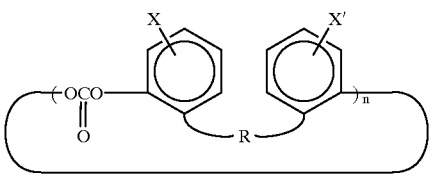

(1)-1 wherein R, X, X' and n are the same as defined above.

5. The polycarbonate composition of claim 1, wherein the cyclic aromatic carbonate is represented by the following formula (1)-2:

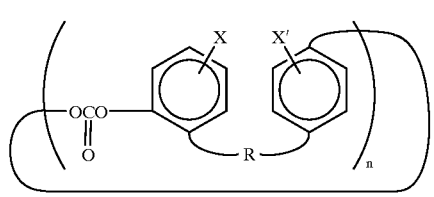

(1)-2 wherein R, X, X' and n are the same as defined above.

6. The polycarbonate composition of claim 1, wherein the cyclic aromatic carbonate is represented by the following formula (1)-3:

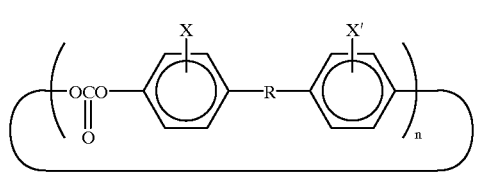

(1)-3 wherein R, X, X' and n are the same as defined above.

7. The polycarbonate composition of claim 1, wherein the linear aromatic polycarbonate is prepared by melt-polycondensing an aromatic dihydroxy compound and a carbonic acid diester in the presence of a polycondensation catalyst.

8. The polycarbonate composition of claim 7, wherein the polycondensation catalyst is an alkali metal compound and in an amount of $1 \times 10^{-7}$ to $5 \times 10^{-6}$ equivalent based on 1 mol of the aromatic dihydroxy compound.

9. The polycarbonate composition of claim 7, wherein the linear aromatic polycarbonate is stabilized by the addition of a stabilizer represented by the following formula (2):

$$A^1-(Y^1-SO_3X^1)_m \quad (2)$$

wherein $A^1$ is a hydrocarbon group having a valence of m, which may have a substituent, $Y^1$ is a single bond or an oxygen atom, $X^1$ is a secondary or tertiary monovalent hydrocarbon group, an ammonium cation or a phosphonium cation, and m is an integer of 1 to 4.

10. The polycarbonate composition of claim 1 which has a melt viscosity change rate of 0.5% or less.

11. A substrate for optical recording media, which comprises the polycarbonate composition of claim 1.

12. An optical recording medium comprising the substrate for optical recording media of claim 11 and an optical recording layer formed on one side of the substrate directly or through an intermediate layer.

13. A method to improve the melt flowability of a linear aromatic polycarbonate comprising mixing the linear aromatic polycarbonate, which has been prepared by reacting an aromatic dihydroxy compound with a carbonate precursor through solution or melt polycondensation, with a cyclic aromatic carbonate of the following formula (1):

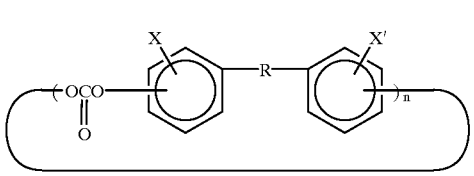

(1)

wherein R is an alkylidene group having 2 to 10 carbon atoms, an alkylene group having 1 to 10 carbon atoms, a cycloalkylidene group having 6 to 10 carbon atoms, a cycloalkylene group having 6 to 10 carbon atoms, a phenyl group-substituted alkylene group having 7 to 11 carbon atoms, an oxygen atom, a sulfur atom, a sulfoxide group or a sulfone group, X and X' are the same or different and each is a hydrogen atom, an alkyl group having 1 to 10 carbon atoms, a cycloalkyl group having 6 to 10 carbon atoms, a halogen atom, an alkoxy group having 1 to 10 carbon atoms or an aryl group having 6 to 20 carbon atoms, and n is a number of 1 to 6.

14. A method to improve the shape transferability at the time of molding of a linear aromatic polycarbonate comprising mixing the linear aromatic polycarbonate, which has been prepared by reacting an aromatic dihydroxy compound with a carbonate precursor through solution or melt polycondensation, with a cyclic aromatic carbonate of the following formula (1):

(1)

wherein R is an alkylidene group having 2 to 10 carbon atoms, an alkylene group having 1 to 10 carbon atoms, a cycloalkylidene group having 6 to 10 carbon atoms, a cycloalkylene group having 6 to 10 carbon atoms, a phenyl group-substituted alkylene group having 7 to 11 carbon atoms, an oxygen atom, a sulfur atom, a sulfoxide group or a sulfone group, X and X' are the same or different and each is a hydrogen atom, an alkyl group having 1 to 10 carbon atoms, a cycloalkyl group having 6 to 10 carbon atoms, a halogen atom, an alkoxy group having 1 to 10 carbon atoms or an aryl group having 6 to 20 carbon atoms, and n is a number of 1 to 6.

* * * * *